Patented Mar. 16, 1937

2,074,188

UNITED STATES PATENT OFFICE 2,074,188

INSECTICIDE AND PROCESS FOR THE MANUFACTURE THEREOF

Jean Ripert, Paris, France, assignor to Le Fly Tox, Paris, France, a corporation of France No Drawing. Application May 25, 1931, Serial No. 539,997. In France November 26, 1930

7 Claims. (Cl. 167—24)

This invention refers to a new insecticide adapted to destroy not only insects but worms and parasites of all kinds and extends to a process for the manufacture thereof.

Said insecticide consists essentially of an extract of pyrethrum in glycol or derivatives of the same.

Pyrethrum is known to contain active principles or pyrethrins, which are insoluble in water and which are deadly to forms of living organisms having cold blood but which are quite harmless to more highly evolved forms of animal life having warm blood. Among the varieties of pyrethrum possessing this characteristic are: pyrethrum cinerariaefolium, pyrethrum roseum and pyrethrum carneum.

Hitherto, said active principles of pyrethrum were usually extracted by means of a mineral oil such as kerosene, paraffin ethers and hydrocarbons in general.

It has been suggested likewise to extract said pyrethrins by means of a solvent soluble in water and the use of ketones has been advocated for this purpose (that of acetone in especial) as well as that of alcohols. When the extract thus secured was diluted in water, a stable colloidal suspension of the pyrethrins was formed, which was usually applied by atomization to destroy insects and the like.

According to this invention, it has been realized that glycol and derivatives thereof could likewise be used to extract the active principles of pyrethrum and to supply subsequently, in combination with water, a stable emulsion of said active principle without the gradual decomposition and loss of toxicity which, according to experience and laboratory tests, is inseparable from the use of mono-alcoholic compounds as solvents or of such that contain alkaloids.

Glycol has, in comparison with acetone and alcohol, for example, the important advantage of being neither poisonous nor inflammable and the insecticide product made from a basis of glycol or derivatives of the same may, therefore, be carried or transported conveniently and without danger. The use of glycol or of glycol derivatives as solvent of the pyrethrins also facilitates the atomization of the insecticide by lowering the superficial tension of the liquid to a greater degree than do derivatives of alcohol or of ketones.

To this end, the following may be used among others, apart from glycol: the monoethyl ether of diethylene glycol, the butyl-monoethyl ether of diethylene glycol, the mono-ethyl-ether of ethylene glycol, butyl mono-ethyl ether of ethylene glycol, diethylene glycol, ethylene glycol, methyl glycol or monomethylic glycol ether, methylglycol acetate, ethyl-glycol acetate, ethylene glycol, mono-methyl ether acetate, 1,4 diethylene oxide and so forth, or again, a mixture of certain of said products.

Pyrethrum flowers are usually treated, but one might likewise treat the stalks, leaves, roots &c.

The process for the extraction of the active principles of pyrethrum may be carried out in two different manners.

The pyrethrins may be extracted by the direct treatment of the pyrethrum (flowers or other portions of the plants) by means of glycol or its derivatives, in which case the process is precisely similar to that used for the extraction of pyrethrins by means of a mineral oil. A washing process may likewise be applied, with concentration under vacuum. Alternatively, the first stage may consist of extracting, by known methods, the active principles of pyrethrum by means of a mineral oil (paraffin or the like), followed by the extraction, by means of glycol or derivatives thereof, of the active principles thus placed in solution in the mineral oil which is subsequently eliminated by decantation and cold washing.

It has already been proposed to carry out the extraction of the pyrethrins in two stages but hitherto a volatile hydrocarbon was used as extraction agent for the first stage, which was eliminated by distillation in the second stage. This method involved a risk of fire which is obviated, according to this invention, by using a heavy hydrocarbon as extraction agent for the first stage, which is thereafter eliminated by simple decantation and cold washing.

The following description exemplifies the second modus operandi above mentioned:

The process may be carried out methodically, either hot or cold, in a battery of mixers of any known type, in which an extract of pyrethrum is first placed, obtained by any known means, followed by glycol or a glycol derivative.

By way of example, an extract of pyrethrum in paraffin will serve as basis of explanation.

The pyrethrin concentration of the extract used may be, for example, of 20, 30 or 50 grams per litre.

By means of a colloidal or other crusher, five litres of this extract are agitated for one hour with a volume of monoethylic glycol ether, for example, proportionate to the desired concentration of the end product.

Monoethylic glycol ether is insoluble in paraffin but dissolves approximately 16% thereof and charges itself with all the active principles which it held in solution.

The monoethylic glycol ether is separated from the undissolved paraffin by decantation and may be used for a fresh extraction process in order to increase its concentration in pyrethrins. Said monoethylic glycol ether, which is already charged with pyrethrins, is therefore agitated with another volume of fresh extract of pyrethrum in the paraffin and the whole mass is further mixed for one hour.

This treatment is continued until the monoethylic glycol ether is considered to contain a sufficiency of pyrethrin.

The extract thus obtained is then purified by the addition of a certain quantity of water, approximately 14%, at a temperature of 5° C. Impurities such as wax, vegetable pigments, paraffin and the like which are dissolved in the monoethylic glycol ether become insoluble and a concentrated extract of pyrethrins in glycol monoethylic ether is secured by decantation and filtration, which may be used directly in the preparation of the end product. It is sufficient to dilute a small quantity of said extract (3%, for example) in ordinary water, in order to obtain a solution, perfectly stable, not only as an emulsion, but also as far as the permanency of its toxic principles is concerned, which solution may be atomized by any suitable means, to destroy insects and the like.

Of course, the quantity of extract in relation to the dilution water will depend upon the degree of concentration of the former, which may be very considerable. The enrichment of the extract in pyrethrins may be pushed to a very high degree, the result being that very small quantities of extract only need be used in order to prepare an insecticide which is ready for use.

What I claim is:

1. A process for the manufacture of an insecticide which comprises extracting the active principles from pyrethrum by means of a mineral oil, extracting the solution of pyrethrins in mineral oil by means of at least one agent of the glycol series, separating the solvent charged with the active principles of pyrethrum by decantation from the undissolved mineral oil, recovering the dissolved mineral oil, purifying the extract secured by washing with water, concentrating said extract under vacuum and adding water to secure a stable emulsion.

2. A process for the manufacture of an insecticide which comprises extracting the active principles from pyrethrum by means of a mineral oil, extracting the solutions of pyrethrins in mineral oil by means of glycol methyl, separating the solvent charged with the active principles of pyrethrum by decantation from the undissolved mineral oil, recovering the dissolved mineral oil, purifying the extract secured by washing with water, concentrating said extract under vacuum and adding water to secure a stable emulsion.

3. A process for the manufacture of an insecticide which comprises extracting the active principles from pyrethrum by means of a mineral oil, extracting the solution of pyrethrins in mineral oil by means of ethylene glycol, separating the solvent charged with the active principles of pyrethrum by decantation from the undissolved mineral oil, recovering the dissolved mineral oil, purifying the extract secured by washing with water, concentrating said extract under vacuum and adding water to secure a stable emulsion.

4. A process for the manufacture of an insecticide which comprises extracting the active principles from pyrethrum by means of a mineral oil, extracting the solution of pyrethrins in mineral oil by means of a mixture of agents of the glycol series, separating the solvent charged with the active principles of pyrethrum by decantation from the undissolved mineral oil, recovering the dissolved mineral oil, purifying the extract secured by washing with water, concentrating said extract under vacuum and adding water to secure a stable emulsion.

5. An insecticide containing the active principles of pyrethrum, dissolved in a solvent comprising a member of the glycol series which has the property of avoiding the decomposition of the pyrethrins.

6. An insecticide in the form of a stable emulsion in water, consisting of a solution of the active constituents of pyrethrum in a medium belonging to the glycol series, diluted by water.

7. An insecticidal spray composition comprising pyrethrins dissolved in a solvent from the class consisting of glycols and glycol ethers.

JEAN RIPERT.